Figure 1:

July 21, 1936.    L. F. SCHUHMACHER    2,048,474
MAT
Filed July 16, 1934    2 Sheets-Sheet 2
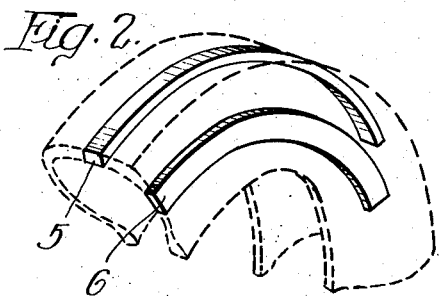
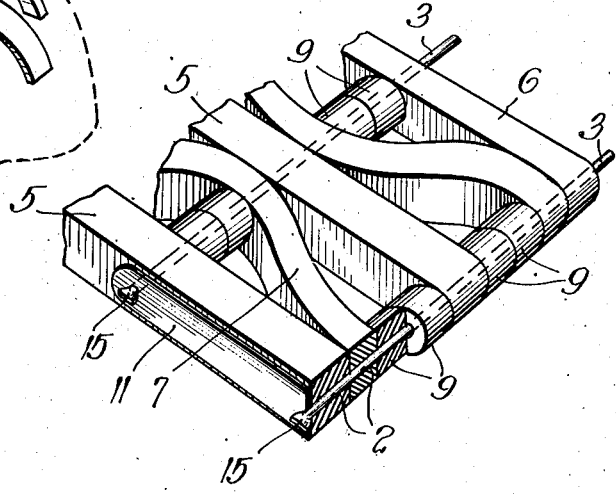
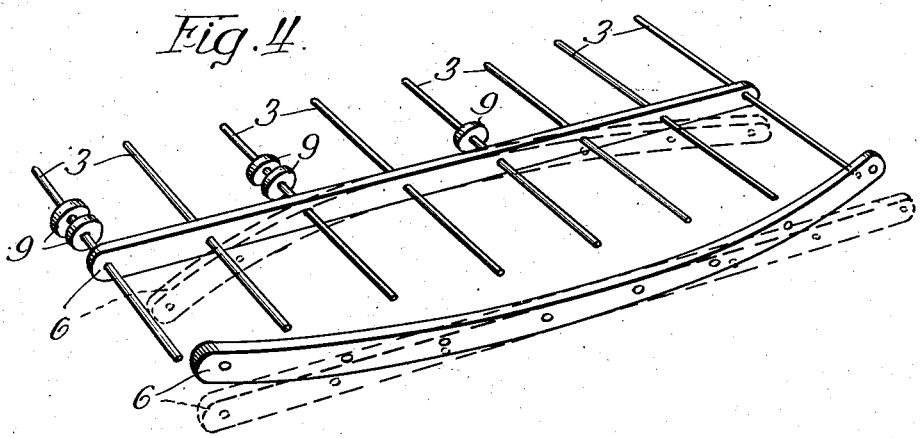
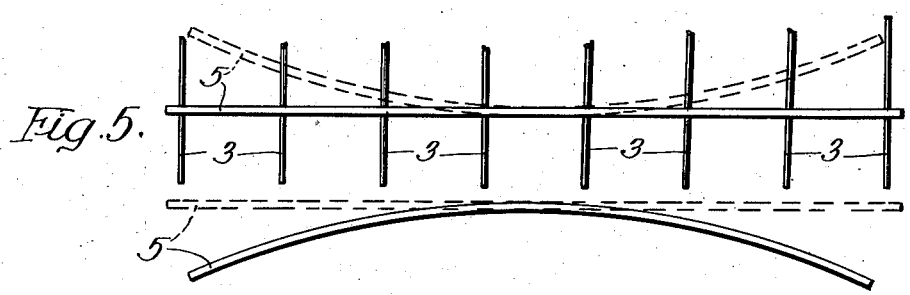
Inventor:
Lawrence F. Schuhmacher
By Brown, Jackson, Boettcher & Skinner
Attys.

Patented July 21, 1936

2,048,474

UNITED STATES PATENT OFFICE 2,048,474

MAT

Lawrence F. Schuhmacher, Chicago, Ill., assignor to Schuhmacher and Schneider Patents, Inc., Chicago, Ill., a corporation of Illinois Application July 16, 1934, Serial No. 735,343

9 Claims. (Cl. 20—78)

The present invention relates generally to mats and is particularly concerned with certain improvements over the mats disclosed and claimed in my co-pending application, Serial No. 633,722, filed September 19, 1932.

The principal object of the present invention is to provide a mat formed of strips of suitable material and disposed in such spaced relation and arranged in such manner that a sturdy, wear-resisting mat is produced, and one which is not easily distorted in service or otherwise rendered unsightly or unserviceable.

A particular object of the present invention is to provide such a mat and to construct the same of elongated strips procured from any suitable source. Specifically, the present invention contemplates using salvaged automobile tires as a source of such strips, and in this connection it is a further object of the present invention to so construct the mat of elongated strips cut from salvaged tires and arrange these strips in such manner that the mat lies flat, although the strips themselves as they are procured from such source are usually curved in various directions. It is to be understood, of course, that the present invention is not necessarily to be limited to mats formed of strips of material from such source, for in carrying out the principles of the present invention, any suitable strips may be utilized. It is to be noted, however, that used automobile tire casings which are no longer of service as tires are almost universally available and quite inexpensive to procure. For these reasons I prefer to use strips of such material and have illustrated the principles of the present invention as embodied in a construction in which strips from automobile tires are employed.

A further object of the present invention resides in the provision of a mat formed of generally elongated straight strips suitably augmented by other strips which are arranged in a zigzag or sinuous manner so as to provide generally diagonal or angled sections which serve to strengthen the mat against distortion in the plane of the mat by virtue of the cross-bracing effect and which, in addition, provide an improved tread surface for the mat.

Since automobile tire casings and other similar sources of resilient material from which strips can be cut are circular or toroidal in shape, elongated strips procured from such source are neither flat nor straight, generally speaking, but are usually curved, either in the direction of their width or in the direction of their thickness, or a combination thereof, and a still further object of the present invention is to construct a mat of such strips, which normally tend to curve, by arranging the strips in the mat in opposed pairs, so that the tendency of one strip to curve is opposed by the tendency of the adjacent strip or strips to curve. By virtue of this construction, although the strips from which the mat is formed tend to curve in various directions, when completely constructed, the mat lies flat and does not tend to buckle or curl at its margins.

Still further, and having in mind that strips cut from the tread portion of an automobile tire casing are generally somewhat thicker or stiffer than strips cut from the side wall portions, an additional object of the present invention is to form the edge or marginal portions of the mat of elongated strips cut from the center or tread portions of the tire while the central or intermediate portions of the mat are made principally of elongated strips cut from the side wall portions of the tire. If desired, the intermediate portion of the mat may be strengthened or reinforced by one or more of the thicker or stiffer tread strips, and it is therefore a further object of the present invention to arrange the strips in this manner, particularly where the mat is provided with certain of the strips arranged in a zigzag or sinuous manner. In this connection, it is a still further object of the present invention to utilize side wall strips for these sinuous zigzag portions and to cut and perforate these latter strips to the same dimensions that the other strips are cut, whereby when the mat is assembled the zigzag or sinuous strips are under a somewhat greater tension than the other strips, with the result that they react against the adjacent straight strips. Making these adjacent or straight strips of the thicker tread portions of the tire therefore materially improves the mat.

Still further, an additional object of the present invention is to form such zigzag or sinuous strips by the proper positioning of suitable spacer means between the strips arranged in such manner that when all of the strips are brought together to form the mat, the zigzag or sinuous strips are automatically brought to the desired curvature.

A further object of the present invention is the provision of a mat or similar device formed of narrow elongated strips of suitable material properly spaced by disks or other suitable means, preferably formed of the same or similar material as the strips themselves, in connection with suitable means threaded through openings or apertures in the strips and the spacing elements, are preferably formed of rubber or a rubber containing stock, but it is to be understood that any suitable material may be employed if desired. According to one commercial form of my invention, the material of which the strips 5, 6 and 7 and spacers 9 are formed consists of salvaged automobile tire casings. A material of this nature is exceedingly tough, yet is flexible and resilient and, being universally available and quite inexpensive, is admirably adapted for the purpose of making mats and such articles. It is to be distinctly understood, however, that the present invention is not to be necessarily limited to the use of such material.

Figure 2:
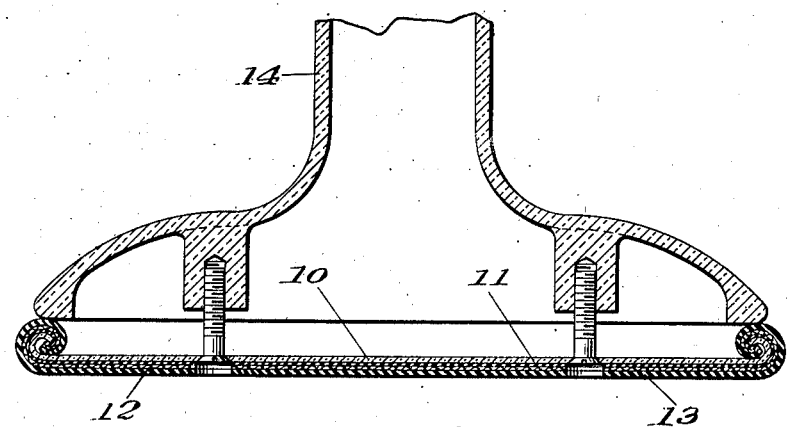

Figure 2 illustrates a portion of a tire casing and, in full lines, two strips which have been cut from different portions thereof. It was mentioned above that certain of the strips, specifically those cut from the tread portion of the wire, are curved in the direction of their thickness, while others, specifically those cut from the side wall portions of the tire, are curved generally in the direction of their width. Strips cut from other portions of the tire have various combinations of these curvatures. Usually, the strips from the tread portions of the tire are thicker or stiffer than strips cut from the side wall portions of the tire, and therefore the thicker or stiffer mat strips 5 (Figure 1) are formed from such tread strips where the source of the material is discarded automobile tire casings, and the thinner or more flexible strips 6 are usually side wall strips, and also the serpentine strips 7 are side wall strips, that is to say, the strips 6 and 7 are cut from the side wall portions of the tire. This is, of course, not absolutely essential but is preferred, since the tread strips are somewhat stiffer or thicker than the side wall strips, and hence when these strips are used at the edges of the mat, and occasionally in the intermediate portion of the mat, the latter is strengthened and reinforced by such placement.

The spacing disks 9 can be cut by suitable tools from either the tread portion or the side wall portion of the tire, but in any one mat all of the spacing disks should be cut from the same portion of the tire in order that the thickness of the disks shall be uniform. However, if the tires are well worn, the tread portions and the side wall portions may be of approximately the same thickness, in which case the disks in any one mat may come from either portion of the tire. The tread strips are, however, somewhat stiffer, even though they are of the same thickness, because of the greater amount of fabric in these sections, and therefore it is preferable, but not necessary, that the edge and intermediate strips 5 should be tread strips, while the thinner or intermediate strips and the zigzag or serpentine strips should be side wall strips, where convenient.

Forming the spacing disks substantially cylindrical in shape and the same size as the width of the strips themselves, as the strips wear in service the disks tend to rotate on the rod members 3 to continually present new surfaces to be contacted. Since new surfaces are continually presented, there is a tendency for the spacing disks to outlast the strips themselves. As a result of this arrangement, the spacing disks serve to form an anti-skid surface, in addition to the surface of the strips themselves, to prevent any one from slipping on the mat.

Figure 2 also illustrates how the strips cut from a tire are usually curved in some fashion. However, it is practically essential that the mat should lay flat and not curl up at the edges or at the corners and, as mentioned above, one feature of the present invention is to construct a mat which lays flat from strips which are normally curved, such as strips cut from automobile tire casings or similar material. In order to construct a mat which lays flat, I propose to arrange the inherently curved strips in a certain manner. In order to do this, I assemble the mat strips in pairs, somewhat in the manner indicated in Figures 4 and 5. In this respect, it is a further advantage to have the tread strips used as the edge strips of the mat, since, in the first place, the tread strips 5 are curved in the direction of their thickness, and, in the second place, these strips are usually stiffer than side wall strips. Also, tread strips can be straightened with less likelihood of buckling or curling. By arranging the strips in opposed pairs, the curvature of one of the strips is offset by the equal but opposite tendency of the other strip to curve. Another advantage of using the tread strips for the edges is that these strips are not so likely to buckle, not only because of their tendency to curve only in the direction of their thickness, but also due to the fact that the side wall strips are somewhat thinner or more flexible and, also, the side wall strips tend to curve in a general direction of their width. In both cases, however, the strips are assembled on the mat with the curves thereof in opposite relation, this being illustrated in Figures 4 and 5.

Figure 5 illustrates the application of the two outer marginal strips 5, it being noted that the full line position of the first strip indicates its position in the mat and the dotted line position of this strip being the position which the strip occupies, by the inherent curvature of the strip, before it was assembled on the spacing rods 3. The other strip, however, is shown in its normal curled position in full lines, indicating the position the strip takes just before it has been stretched to its dotted line position and threaded over the rods 3. Figure 4 illustrates the same relations for the intermediate strips 6, that is, one strip is shown in full lines in assembled position, and the dotted line position of this strip showing the curvature which it would normally take and which it did take before assembly on the rods 3. The other strip 6 is shown in its normal position in full lines before assembly, while the dotted line position of this strip shows the same after it is threaded onto the rods 3. It is, of course, not absolutely necessary that each and all of the strips be assembled in pairs which lie directly alongside each other. For example, looking at Figure 1, the two marginal strips 5 at the upper portion of the figure may be assembled with their curvatures opposite, while the two serpentine strips 7 at this side of the mat, although separated by one of the strips 5, are assembled with their curvatures opposite, referring to the inherent tendency of the strip to curve in opposite directions from the plane of the mat and not to the curvature of these strips which is imparted thereto by arranging the spacers 9 first on one side and then on the other of these strips.

While I have shown and described above the preferred construction in order to illustrate the principles of my invention, it is to be understood that the use of widely different constructions may be employed in the practice of the broader aspects of my invention. For example, it is not necessary that serpentine strips be employed, or if serpentine or similar strips are employed it is not essential that they be separated by a straight strip as shown in the drawings. Likewise, it is not necessary to arrange the serpentine strips with their curvature in the relation shown in Figure 1. Likewise, it is not essential to the present invention, except as to certain specific features thereof, to employ strips cut from discarded automobile tire casings, since any other suitable material may be employed where convenient and available, and such material may be such that the strips may all be straight and not have any inherent curvature. However, as mentioned above, worn and discarded automobile tire casings are quite inexpensive and available in quantities in practically all communities and therefore they form a convenient source for material which is eminently satisfactory to use for mats and the like. Similarly, I do not intend to be restricted to the size or proportions of the mat illustrated in Figure 1, since mats in greater length or width or lesser length and width or of varying proportions may be constructed according to the principles of my invention. For example, mats may be arranged for use as stair treads, doorstops, car floors, running boards of automobiles, and many other uses.

Therefore, what I claim as new and desire to secure by Letters Patent is:

1. A mat comprising a plurality of separate strips of resilient material having a tendency to curve in one direction, and means securing said strips together in spaced relation in pairs so positioned that the tendency of one strip to curve in one direction is opposed by the tendency of the adjacent strip to curve in the other direction.

2. A mat comprising a plurality of separate strips of resilient material cut from the tread and side wall portions of salvaged tire casings, the tread strips tending to curve in the direction of their thickness and the side wall strips tending to curve in the direction of their width in accordance with the shape of the tire from which they are cut, spacing means maintaining said strips on edge and spaced laterally in the mat, the sides of the mat being formed of tread strips assembled in pairs with their inherent tendency to curve opposed, and the intermediate portion of the mat being formed of side wall strips also assembled in pairs with their inherent tendency to curve opposed, and means extending from one side of the mat to the other for holding all of said strips and said spacing means in position.

3. In a mat formed of separate curved strips of appreciable rigidity, the method of assembling said strips so that the mat will lie flat, which comprises separately arranging said strips edgewise in pairs with one strip of each pair placed with its curvature opposite that of the other strip, and then securing said strips together.

4. In a mat formed of narrow elongated strips some of which are curved laterally in the direction of their thickness and others of which are curved edgewise in the direction of their width, the method of assembling said strips so that the mat will lie flat, which comprises arranging said laterally curved strips in pairs at the sides of the mat with their curvatures opposed, arranging said edgewise curved strips in pairs to form the central strips of the mat and also with their curvatures opposed, straightening said strips and securing the strips together laterally.

5. A mat comprising a plurality of narrow elongated strips, transverse connecting members passing through openings in and connecting said strips together, and means to space the strips apart, said spacing means comprising disks mounted to rotate on said transverse members and having a diameter equal to the width of said strips, whereby as the strips wear in service said spacing disks are rotated to continually present new surfaces to be contacted.

6. A mat comprising a plurality of strips of resilient material cut from the tread and side wall portions of salvaged tires, the tread strips tending to curve in the direction of their thickness and the side wall strips tending to curve in the direction of their width in accordance with the shape of the tire from which they are cut, spacing means maintaining said strips on edge and spaced laterally in the mat, the sides of the mat being formed of tread strips assembled in pairs with their inherent tendency to curve opposed and the intermediate portion of the mat being formed of side wall strips also assembled in pairs with their inherent tendency to curve opposed, sinuously arranged side wall strips disposed between certain of the tread wall strips, the sinuosity of said strips serving to place the same under greater tension than and to cause them to react against the tread strips, and means extending from one side of the mat to the other for holding all of said strips and said spacing means in position.

7. A mat comprising a plurality of separate strips of a material consisting of vulcanized rubber and reenforcing layers of fibrous strands embedded therein, each strip having an inherent and appreciable tendency to curve in one direction due to the strength of the strip and the degree of rigidity imparted thereto by said reenforcing layers, and means securing said strips together in edgewise spaced apart relation, the strips of each pair being so positioned that the internal stresses in the rubber and embedded fibrous reenforcing layers of one strip when straightened are substantially equal but opposite in direction to like stresses of the other strip when the latter is straightened and brought alongside said one strip.

8. A mat comprising a plurality of separate strips of resilient material cut from the tread and side wall portions of salvaged tire casings, each of the strips having appreciable edgewise and lateral rigidity by virtue of the included layers of reenforcing fabric-like tire carcass, the strips therefor possessing substantial strength both edgewise and laterally and each strip having an inherent tendency to curve in a certain direction, and means securing said separate strips together in opposed pairs so that the strips are arranged with the carcass layers edgewise and the resulting tendency of one strip to curve in one direction offset by the equal tendency of the other carcass-embedded strip to curve in the opposite direction.

9. A mat comprising a plurality of strips cut from an automobile tire casing, each of said strips having an inherent tendency to curve in a certain direction, and means securing said strips together, said strips being so relatively disposed that the inherent tendency of certain of the strips to curve in one direction is opposed by the inherent tendency of certain other of the strips to curve in the opposite direction to such an extent that the mat as a whole is free from curving and buckling and will lie flat.

LAWRENCE F. SCHUHMACHER.

July 21, 1936.  W. J. SLAGLE  2,048,475

FRICTION PADDING MATERIAL

Filed Oct. 10, 1930

Inventor:
William Jordan Slagle

By  Wm. B. Wescott

Attorney